United States Patent [19]

Deininger et al.

[11] 3,976,800

[45] Aug. 24, 1976

[54] PROCESS FOR THE MANUFACTUE OF BISCUITS

[75] Inventors: Rolf Deininger; Erich Wolf, both of Cologne, Germany

[73] Assignee: Klosterfrau Berlin GmbH, Germany

[22] Filed: Oct. 21, 1975

[21] Appl. No.: 624,575

Related U.S. Application Data

[63] Continuation-in-part of Ser. No. 400,807, Sept. 26, 1973, abandoned.

[30] Foreign Application Priority Data

July 12, 1973 Luxemburg.............................. 68000

[52] U.S. Cl................................ 426/311; 426/585; 426/648; 426/650; 426/656; 426/657; 426/658; 426/662; 426/491; 426/512

[51] Int. Cl.²....................... A23L 1/30; A23J 1/14; A23J 1/20

[58] Field of Search ............. 426/580, 585, 588, 72, 426/311, 648, 656, 657, 650, 658, 662, 491, 496, 504, 507, 512

[56] References Cited
UNITED STATES PATENTS

| | | | |
|---|---|---|---|
| 2,334,401 | 11/1943 | Fitzpatrick et al.............. | 426/662 X |
| 2,437,080 | 3/1948 | Daniel................................ | 426/491 |
| 3,033,132 | 5/1962 | Duncan et al. ................. | 426/504 X |
| 3,185,574 | 5/1965 | Gabby et al. ................... | 426/658 X |
| 3,682,652 | 8/1972 | Corbin et al..................... | 426/656 X |

OTHER PUBLICATIONS

*Comprehensive Survey of Starch Chemistry,* vol. I, Walton, 1928, p. 137.

Primary Examiner—S. Leon Bashore
Assistant Examiner—Arthur L. Corbin
Attorney, Agent, or Firm—Wenderoth, Lind & Ponack

[57] ABSTRACT

A high-protein, low-carbohydrate, low-fat bar is produced by kneading a. a melt of edible fat and lecithin or a vegetable phosphatide with b. a food powder having protein content of at least 60% by weight based on solids and a carbohydrate content of 5 to 35% by weight based on solid content and additives, to render the resultant mixture thixotropically flowable and homogeneous. The resultant mixture is shaped into a bar and solidifies on standing.

9 Claims, No Drawings

PROCESS FOR THE MANUFACTUE OF BISCUITS

This is a continuation-in-part of Ser. No. 400,807, filed Sept. 26, 1973, now abandoned.

This invention relates to a process for the manufacture of biscuits from a foodstuff mixture capable of flow in a warm state, containing fats, proteins, carbohydrates and additives, by shaping the warm mixture, and subsequently hardening it by cooling, and to biscuits which are manufactured by this process.

Metabolic disturbances and obesity are frequently due to an excess of carbohydrates and an inadequate amount of protein in the food ingested. This can be counteracted by providing foodstuffs of minimum carbohydrate content and high protein content, without excessive fat content. Experience has shown that foodstuff granules of such composition, if taken in amounts which suffice for the desired compensation in cases of obesity, cause revulsion so that - at least from a long-term point of view - the prospect of successfully reducing the portion of carbohydrate in the total foodstuffs provided, through the use of such granules, is not hopeful. Granules cannot be throughly chewed and can only be ground between the teeth, and this is one reason for the lack of enjoyment in consumption of such granules.

It is the object of the present invention to provide a foodstuff which has a relatively high protein content, a low fat content and a minimum carbohydrate content and which can be chewed and is pleasant to consume, even in amounts sufficient to replace a daily main meal.

The above objectives are met by the present invention whereby a composition is prepared by admixing:
  a. forming a melt comprising i) 1 part by weight of edible fat (melting in the range of 28° to 40°C) and
  ii. 0.03 to 0.2 part by weight of crude lecithin obtained from soya beans and/or vegetable phosphatides chemically related thereto, and
  b. 1.5 to 4 parts by weight of:
    i. dry edible powder containing protein in an amount of at least 60% by weight based on the content of said powder protein which protein substantially retains its natural structure, and 5 to 35% by weight carbohydrate, based on the solids content of said powder.

The mixture is rendered thixotropic and is homogenized, by kneading while warming to a temperature of 28° to 50°C, is shaped while flowable and is hardened by permitting it to stand while cooling. The above objects are met as well by the present invention whereby a composition is prepared by admixing:
  a. forming a melt comprising i) 1 part by weight of edible fat (melting in the range of 28° to 40°C) and
  ii. 0.03 to 0.2 part by weight of crude lecithin obtained from soya beans and/or vegetable phosphatides chemically related thereto, and
  b. 1.5 to 4 parts by weight of:
    i. dry edible powder containing protein in an amount of at least 60% by weight based on the content of said powder protein which protein substantially retains its natural structure, and 5 to 35% by weight carbohydrate, based on the solids content of said powder and
    ii. a total of 0.1 to 1 part by weight additives selected from the group consisting of sorbitol, mannitol, xylitol, mineral salts, flavoring substances and vitamins.

The mixture is rendered thixotropic and is homogenized, by kneading while warming to a temperature of 28° to 50° C, is shaped while flowable and is hardened by permitting it to stand while cooling.

The present invention produces biscuits of a mixture which contains low fat, high protein, low carbohydrate and additives, which can be chewed at room temperature and which breaks on chewing, and which is in the form of a thixotropic consolidated gel.

The biscuits contain the following homogeneously distributed components: 1 part by weight of edible fat melting at 28° to 40°C, 0.03 to 0.2 part by weight of crude lecithin obtained from soya beans and/or vegetable phosphatides chemically related thereto, 0.9 to 2.4 parts by weight of protein, at most 1.4 parts by weight of carbohydrates.

The biscuits can also contain a total of 0.1 to 1 parts by weight of additives, containing sorbitol, mannitol, xylitol, mineral salts, flavoring substances and/or vitamins.

The biscuits manufactured according to the present invention can be bitten or chewed, that is to say they break in a crisp fashion when vigorously bitten by human teeth. In the case of known bars of chocolate which can be chewed, the strength which allows the material to be chewed is due to the very high content (60% or more) of fats which are hard at room temperature, while in known biscuits made of glucose, their strength results from the compression of the glucose. The binding capacity of sugar cannot be utilized in the present invention, at least not to a significant extent, because of the desired minimum content of carbohydrates. The internal structure of chocolate is also unsuitable for the invention because it is based on a high content of carbohydrate and fat, which the present invention seeks to avoid.

According to the invention, the desired strength which permits one to bite or chew the material is achieved by using a low carbohydrate content and fat content. The surprisingly high strength of the hardened mixture and its ability to be chewed, is achieved at the comparatively high protein content according to the invention, due to the following circumstances.

The mixture to be shaped is thixotropic, at least when its fat content and lecithin content has been melted by warming. As a result of the pressures exerted during vigorous stirring or kneading, the mass becomes a sol which is capable of flow, and wherein the fat constituent and the lecithin constituent in the molten state form a liquid dispersing agent. If the pressure exerted is relaxed, the mixture solidifies, as with any thixotropic mixture, to a solid gel after some time. The gel is the initial structure of the finished biscuit. On cooling the mixture, for example to room temperature, the temperature falls below the melting point of the fat-lecithin constituent and this constituent solidifies, producing a second structure of the finished biscuit. Presumably, these two structures molecularly interact with one another and this further increase the breaking strength of the biscuit or its resistance to biting.

The high resistance to biting of biscuits according to the invention is only desirable if parts of the biscuit are bitten off by means of the incisors and if the first comminuting bites are exerted thereon within the mouth. The subsequent grinding in the mouth to form a bite, which is ready to be swallowed should on the other hand, as far as possible, not be hampered by the strength. This requirement is met by the invention because under the influence of the body heat in the mouth and of the chewing pressure of the molars, the biscuit mixture finally reverts to its thixotropic state in which it is capable to flow. As a consequence, on crushing a biscuit in the mouth, the biscuit does not crumble or disintergrate into lumps or even into powder, but turns into a pleasant tasting paste which can be swallowed and enjoyed.

The consistancy of the biscuits is essentially determined by the proportions of the three basic components, protein, fat and lecithin. If the lecithin content is increased while keeping the protein content and fat content the same, the mixture which is capable of thixotropic flow, becomes more fluid and hence, if the lecithin content is high, a high protein content can also be provided at the expense of the fat content. Conversely, the protein content can also be reduced in favor of the fat content, but there are limits to this due to the initially presented reasons relating to nutritional physiology.

Amongst the vegetable phosphatides mentioned, which are used in conjunction with the invention, instead of the crude lecithin obtained from soya beans, or together therewith, it is possible to use cephalin or inositol-phosphatides, or crude lecithins obtained from seeds of maize, peas, lupines or wheat.

As edible fat it is possible to use in conjunction with the invention coconut fat having a chain length of 12 to 18 carbon atoms and/or oils obtained from sunflowers, soya beans, maize and whales and hardened so that the melting point of said oils will be in te range of 28° to 40°C.

By the natural structure of the protein powder is meant the molecular structure and the spatial helix structure of the protein macromolecules. The protein powder cannot be isolated entirely without impairing the natural structure but the invention seeks to use as gentle conditions as possible when isolating the protein powder in order, to the extent possible, to retain the natural structure which is advantageous for human nutrition.

In isolating the protein powder, for example, from milk, te protein powder is obtained mixed with mineral salts and the like, unless considerable efforts are made to elute these. However, this is not necessary. Since te protein is obtained from foodstuffs, the mineral salts and the like which are obtained together with the protein powder are not harmful in human nutrition; rather, they are suitable for use as additives. These mineral salts and the like can be included in the calculation of the additives provided; thus additives which are required to be added separately to the mixture may be employed correspondingly smaller amounts.

Preferably, because it is outstandingly suitable for human nutrition, the protein employed is milk protein which is isolated by drying the dialysis residue of an osmosis dialysis of skimmed milk and/or whey against water, using a dialysis membrane which is permeable to lactose — and hence also to the salt ions which are present in the milk unless these are hydrated — but is impermeable to milk protein, while constantly preventing the flocculation of protein by adequately maintaining a neutral and sterile medium and by avoiding heating to about 65°C. In this way, milk protein which largely has the natural structure and has the desired high protein content and low carbohydrate content can be isolated on a large industrial scale using simple means.

Advantageously, because it is available at attractive prices, there may also be employed a vegetable protein which is isolated by grinding parts of plants which contain protein, suspending the product in water, eluting the excess carbohydrates, mineral substances and other water-soluble substances from this suspension and drying the suspension residue, which consists of enriched protein, under gentle conditions. Parts of plants, containing protein, which can be used are, for example, soya beans, cereal grains, potatoes and the like.

It is advantageous if at least 1/5 of the protein powder employed is milk protein, isolated as described above. It is also advantageous if at least 1/5 of the protein powder employed is vegetable protein, isolated as desribed above. A combination in which the protein powder employed consists in part of milk powder and in part of vegetable protein is particularly preferred since it satisfies both economic nutritional physiology requirements. The milk protein desirably contains 20 to 25% lactose.

Under certain circumstances, additives are only required in small amounts and this, under certain circumstances produces difficulties in homogeneously distributing the small amounts in the mixture. Sweeteners, for example sorbitol, mannitol, xylitol,, saccharin and/or cyclamate, and other water-soluble additive such as, for example, vitamins of the B-complex, and trace elements such as iron, manganese and the like can be very simply homogeneously mixed into the mixture by mixing them into the solution or suspension containing protein, which is obtained in the manufacture of the protein powder and is already purified, and mixing them into the melt conjointly with the dried protein powder obtained therefrom, in which they are present in a homogeneously distributed form.

If desired 0.2 to 0.8 parts by weight of sorbitol, mannitol and/or xylitol may be employed. By this employment of sorbitol, mannitol and xylitol a desired sweet taste will be evoked. These sugar interchange agents should be stirred into the melt in fine pulverized form, i.e. with a particle size of about 60 to 100 microns.

The mixture can be shaped by extruding it as a band and subsequently cutting the band into the desired biscuit form. However, it is preferably shaped by introducing the finished homogenized mixture, while maintaining a thixotropic flowability which suffices for molding in individual portions into individual biscuit molds lined with a smooth wrapping film and then completely wrapping these portions in the wrapping film while simultaneously pressing them into the biscuit mold and molding and hardening them. The thixotropic flowablity is maintained by further processing the mixture, which is capable of flow due to kneading, as far as possible by molding it immediately, so that it has no time to harden into the gel state. If appropriate, the pressure required for molding is chosen sufficiently high that it also prevents the hardening to give a gel. For the same reasons care is taken that the mixture does not cool, prior to the final molding, to the point that it loses its ability to flow.

In this preferred embodiment, biscuits of greater density can be produced than by molding as a band. Furthermore, the biscuits molded in the smooth wrapping film, according to this preferred process, have a smoother surface than those molded by the extrusion process. The high density and the smooth surface make them more enjoyable to consume.

The following embodiments are illustrative.

EXAMPLE 1

1,400 liters of skimmed, sterile cow's milk at 60°C are dialysed by dialysis against singly distilled water until the sugar content has been reduced to 20% by weight relative to the solids and the mineral salt content has been reduced to 6% by weight relative to the solids. The dialysate is concentrated to 200 liters by evaporation in vacuo at 60°C. 48 grams of sodium saccharin are stirred into the concentrated solution, containing protein, and this solution is then spray-dried while keeping the temperature of the solids below 50°C. The dry residue obtained consists of 56.6 kilograms of protein powder of which the protein has been left in its natural structure. The protein powder has a protein content of 70% by weight, a lactose content of 20% by weight, a salt content of calcium salts, potassium salts and phosphorous salts, totalling 6% by weight, and contains about 0.12% by weight of saccharin, the remaining percentage by weight being water.

30 kilograms of coconut fat of chain length C 12 to C 18, melting at 36°C, are introduced in the molten state into a kneader equipped with a heat-insulated kneader jacket. This melt is warmed to 43°C. 1.5 kilograms of crude lecithin obtained from soya beans are stirred into the warm melt. The mixture is stirred for 5 minutes by means of the kneader. 5 kilograms of freeze-dried ripe strawberries granulated to a particle size of at most 2 millimeters are introduced into this mixture, and the mixture is stirred for 5 minutes by the kneader. Into this mixture are mixed 40 kilograms of protein powder and 0.5 kilogram of an oily solution containing: 13.6 g of vitamin A acetate (1.5 million international units per gram); 3.5 g of vitamin D3 (0.4 million international units per gram) and 73.5 g of vitamin E acetate, the remainder being edible oil. The remaining 16.6 kilograms of protein powder are mixed with 1.3 kilograms of citric acid which is free of water of crystallization, 95 g of vanillin, 3 g of vitamin B1, 3.8 grams of vitamin B2, 5.7 g of vitamin B6, 13.3 milligrams of vitamin B 12, 38.2 g of nicotinic acid amide; 200 grams of vitamin C, 24.4 grams of calcium panthothenate and 2.5 grams of folic acid, and then stirred into the mixture contained in the kneader. The mixture produced in the kneader is rendered thixotropically flowable, and is homogenized by kneading while maintaining a temperature of 35°C and is molded, while still capable of flow and maintaining a temperature of 35°C, to give an approximately 10 millimeters thick and 50 millimeters broad band which is then cooled to 23°C. 24 millimeter long sections are cut from the cooled band as parallelepiped biscuits which are then consolidated by further cooling to room temperature of 20°C. These are allowed to stand for 1 hour. The consolidated biscuits are wrapped in an internally waxed metal foil.

The biscuits obtained in this manner can be broken and chewed at a room temperature of 20°C and weigh 7 grams per piece, the density being 0.75 grams/cm³ ± 5%. Such a biscuit weighing 7 grams contains 40% of protein, 33% of coconut fat, 1.7% of crude lecithin and 12% of lactose, the remainder being mineral salts, vitamins, saccharin and granulated strawberries.

EXAMPLE 2

Example 1 is repeated except that the molding of the mixture, while still warm, is not carried out in the band but by introducing the finished homogenized mass, while maintaining a temperature of 32°C, in individual portions of 7 grams each, into individual biscuit molds which are open at the top and are lined with a wrapping film. The biscuit mold consists of a parallelepiped cavity of 24 millimeters width and 54 millimeters length which is open at the top over its entire outline. In this biscuit mold, the portion is completely wrapped in the wrapping film at the same time compressed by a punch which fits into the opening of the biscuit mold to give a parallelepiped biscuit of size approximately 24 × 50 × 10 millimeters. The wrapping film consists of aluminum and is smooth and waxed-coated on the side which comes into contact with the biscuit. The wrapped biscuit is taken out of the biscuit mold and hardened to a chewable state by cooling to a room temperature of 20°C and allowing it to stand for one hour.

The composition of the biscuits obtained and their sizes are the same as for the biscuits obtained according to Example 1, the sole differences being that the biscuit surface has the smoothness of the solidifed coconut fat employed on all its sides and that the density is greater, namely 0.78 grams/cm³ ± 5%. This greater density assists the desired ability of the biscuit to be chewed. As a result of the great smoothness, the flavor of the biscuits is improved.

EXAMPLE 3

Example 1 is repeated with the sole difference that instead of 56.6 kilograms of protein powder obtained from skimmed cow's milk, 14.14 kilograms of protein powder obtained from skimmed cow's milk and 42.45 kilograms of protein powder obtained from wheat are employed. The protein powder is obtained from wheat as follows: 240 kilograms of flour from wheat grains are suspended in 1,000 liters of water. Elution reduces the carbohydrate content of the washed material to 10% by weight relative to solids and the mineral salt content to 5% by weight relative to solids. The washed material is dried under gentle conditions and 42.45 kilograms of wheat protein powder containing 85% of protein are obtained. The biscuits otherwise manufactured according to Example 1 have a slightly different composition in accordance with the different carbohydrate content and content of mineral substances. The density of the solidified biscuit is 0.9 gram/cm³ ± 5%.

EXAMPLE 4

Example 1 is repeated with the sole difference that instead of the 56.6 kilograms of protein powder obtained from skimmed cow's milk, 14.14 kilograms of protein powder obtained from skimmed cow's milk and 42.45 kilograms of protein powder obtained from soya beans, containing 85% relative to protein, are employed.

EXAMPLE 5

1,400 liters of skimmed, sterile cow's milk at 60°C are dialysed by dialysis against singly distilled water until the sugar content has been reduced to 20% by weight relative to the solids and the mineral salt content has been reduced to 6% by weight to the solids. The dislysate is concentrated to 200 liters by evaporation in vacuo at 60°C. This concentrated solution is then spray dried while keeping the temperature of the solids below 50°C. The dry residue obtained consists of 56.6 kilograms of protein powder, the protein of which has retained its natural structure. The protein powder has a protein content of 70% by weight, a lactose content of 20% by weight, a salt content of calcium salts, potassium salts and phosphorus salts, totalling 6% by weight and the remaining percentage by weight being water.

30 kilograms of coconut fat of chain length C 12 to C 18, melting at 36°C, are introduced in the molten state into a kneader equipped with a heat-insulated kneader jacket. This melt is warmed to 43°C. 1.5 kilograms of crude lecithin obtained from soya beans are stirred into the warm melt. The mixture is stirred for 5 minutes in the kneader. 5 kilograms of freeze-dried ripe strawberries granulated to a particle size of at most 2 millimeters are introduced into this mixture, and the mixture is stirred for 5 minutes by means of the kneader. Into this mixture are mixed 40 kilograms of protein powder, and 20 kilograms of sorbitol granulated to a particle size of about 60 to 100 microns and half a kilogram of an oily solution containing: 13.6 g of vitamin A acetate (1.5 million international units per gram); 3.5 g of vitamin D3 (0.4 million international units per gram) and 73.5 g of vitamin E acetate, the remainder being edible oil. The remaining 16.6 kilograms of protein powder are mixed with 1.3 kilograms of citric acid which is free of water of crystallization, 95 g of vanillin, 3 g of vitamin B1, 3.8 g of vitamin B 12, 38.2 g of nicotine acid amide, 200 g of vitamin C, 24.4 g of calcium panthothenate, 2.5 g of folic acid and 85.5 g of iron-II-phosphate, and is then stirred into the mixture contained in the kneader. The mixture produced in the kneader is rendered thixotropically flowable and is homogenized by kneading while maintaining a temperature of 35°C. The mixture is molded, while still capable of flow and at a temperature of 35°C and is formed by pressing to 11 mm ± 5% thick, 50 mm ± 5% long and 23 mm ± 10% broad parallelepiped biscuits. The biscuits are then consolidated by cooling to room temperature of 20°C and are allowed to stand for an hour.

The biscuits obtained in this manner can be broken and chewed at a room temperature of 20°C and weigh 9 grams per piece, the density being 0.70 grams/cm$^3$ ± 5%. Such biscuit, weighing 9 grams, contains 32% of protein, 26% of coconut fat, 1.4% of crude lecithin, 10% of lactose, 20% of sorbitol, the remainder being mineral salts, vitamins, saccharin and granulated strawberries.

EXAMPLE 6

Example 5 is repeated except that instead of sorbitol, xylitol is used.

EXAMPLE 7

Example 5 is repeated except that instead of sorbitol, mannitol is used.

EXAMPLE 8

Example 5 is repeated except that instead of 20 kilograms of sorbitol, 15 kilograms of sorbitol are used.

EXAMPLE 9

Example 5 is repeated except that instead of 20 kilograms of sorbitol, 10 kilograms of sorbitol are used. In this Example, 20 g of sodium saccharin are stirred into the concentrated protein containing solution before it is spray dried, so that the obtained 56.6 kilograms of protein powder containing this 20 g of sodium saccharin in homogeneous dispersion, is added to the mass with the protein powder.

EXAMPLE 10

Example 9 is repeated except that instead of 10 kilograms of sorbitol, only 6 kilograms of sorbitol are used.

EXAMPLE 11

Example 5 is repeated except that 1.3 kilograms of citric acid which is free of water of crystallization, 95 g of vanillin, 3 g of vitamin B1, 3.8 g of vitamin B2, 5.7 g of vitamin B6, 13.3 milligrams of vitamin B 12, 38.2 g of nicotine acid amide, 200 g of vitamin C, 24.4 g of calcium panthothenate, 2.5 g of folic acid, 85.5 g of iron-II-phosphate are stirred into the concentrated protein containing solution before this is spray dried, so that the obtained 56.6 kilograms of protein powder contain these additions in homogeneous dispersion, which are added to the mass with the protein powder.

EXAMPLE 12

Example 5 is repeated except that instead of 56.6 kilograms of protein powder obtained from skimmed cow's milk, a mixture of protein powder is employed consisting of 28.3 kilograms of protein powder obtained from skimmed cow's milk and 28.3 kilograms of protein powder obtained from wheat. The protein powder is obtained from wheat as follows: 160 kilograms of flour from wheat grains are suspended in 650 liters of water. Elution reduces the carbohydrate content of the washed material to 10% by weight relative to solids and the mineral salt content to 5% by weight relative to solids. The washed material is dried under gentle conditions and 28.3 kilograms of wheat protein powder containing 85% of protein are obtained.

What we claim is:

1. A process for making a chewable and edible low carbohydrate, high protein and low fat bar, which process consists of:
  a. melting one part by weight of an edible fat having a melting point in the range of 28° to 40° C together with 0.03 to 0.2 parts by weight of lecithin or a vegetable phosphatide to form a dispersing agent;
  b. kneading into the dispersing agent 1.5 to 4 parts by weight of a food powder containing at least 60% by weight protein based on solids and containing 5 to 35% by weight carbohydrates based on solids, said protein substantially retaining its natural structure, said kneading being performed at a temperature of 28° to 50° C thereby rendering the resultant mixture thixotropic;
  c. shaping said thixotropic mixture while flowable and
  d. permitting the shaped flowable mixture to stand and cool, thereby solidifying.

2. A process for making a chewable and edible low carbohydrate, high protein and low-fat bar, which process consists of:
  a. melting one part by weight of an edible fat having a melting point in the range of 28° to 40° C together with 0.03 to 0.2 parts by weight of lecithin or a vegetable phosphatide to form a dispersing agent;
  b. kneading into the dispersing agent 1.5 to 4 parts by weight of a food powder containing at least 60% by weight protein based on solids and containing 5 to 35% by weight carbohydrates based on solids, said protein substantially retaining its natural structure, and 0.1 to 1 part by weight of additives selected from the group consisting of sorbitol, mannitol, xylitol, mineral salts, flavorings and vitamins or mixtures thereof to form a homogeneous flowable mixture, said kneading being performed at a temperature of 28° to 50° C thereby rendering the resultant mixture thixotropic;
  c. shaping said thixotropic mixture while flowable and d. permitting the shaped flowable mixture to stand and cool thereby solidifying.

3. The process defined in claim 2 wherein said fat is coconut fat having a melting point of 36° C and a chain length of 12 to 18 carbon atoms, said mixture containing 0.05 parts by weight soya bean lecithin, 1.5 to 2 parts by weight of dry powdered milk protein having a protein concentration of 65 to 70% by weight based on solids and a lactose concentration of 20 to 25% by weight based on solids and said kneading occurring at a temperature of 28° to 35° C.

4. The process defined in claim 2 wherein at least on fifth of the protein is milk protein produced by drying the dialysis residue of an osmosis dialysis of skimmed milk or whey against water using a dialyses membrane permeable to lactose but impermeable to milk protein.

5. The process defined in claim 2 wherein at least one fifth of the protein consists of vegetable protein produced by grinding proteinaceous plant parts and eluting excess carbohydrate therefrom with water.

6. The process defined in claim 5 wherein at least another fifth of the protein consists of vegetable protein produced by grinding proteinaceous plant parts and eluting excess carbohydrate therefrom with water.

7. The process defined in claim 2 wherein said additive component is homogeneously distributed in said protein and is incorporated therewith in said flowable mixture.

8. The process defined in claim 2 wherein said flowable mixture is shaped by forcing it into individual biscuit molds along with a wrapping material.

9. The process defined in claim 2 wherein 0.2 to 0.8 parts by weight selected from the group consisting of sorbitol, mannitol and xylitol are stirred into the dispersing agent in a particle size of about 60 to 100 microns.

\* \* \* \* \*